United States Patent
Schonhardt et al.

(10) Patent No.: US 10,168,240 B2
(45) Date of Patent: Jan. 1, 2019

(54) PRESSURE EQUALIZING ELEMENT

(71) Applicant: Endress + Hauser GmbH + Co. KG, Maulburg (DE)

(72) Inventors: Raphael Schonhardt, Rheinfelden (DE); Michael Lais, Wernbach (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 105 days.

(21) Appl. No.: 15/311,575

(22) PCT Filed: Apr. 20, 2015

(86) PCT No.: PCT/EP2015/058478
§ 371 (c)(1),
(2) Date: Nov. 16, 2016

(87) PCT Pub. No.: WO2015/176890
PCT Pub. Date: Nov. 26, 2015

(65) Prior Publication Data
US 2017/0089794 A1  Mar. 30, 2017

(30) Foreign Application Priority Data
May 22, 2014 (DE) .......... 10 2014 107 251

(51) Int. Cl.
*G01L 19/06* (2006.01)
*G01L 19/14* (2006.01)

(52) U.S. Cl.
CPC ........ *G01L 19/0654* (2013.01); *G01L 19/144* (2013.01)

(58) Field of Classification Search
CPC .......... G01L 19/0654; G01L 19/144
See application file for complete search history.

(56) References Cited

U.S. PATENT DOCUMENTS 6,675,654 B2 * 1/2004 Hegner .......... B01D 39/2093
73/715
6,752,021 B2 * 6/2004 Burczyk .......... G01L 19/0038
73/717

(Continued)

FOREIGN PATENT DOCUMENTS

CN   101910813 A   12/2010
CN   102011859 A    4/2011

(Continued)

OTHER PUBLICATIONS

German Search Report, German Patent Office, Munich, DE, dated Sep. 2, 2014.

(Continued)

*Primary Examiner* — Freddie Kirkland, III
(74) *Attorney, Agent, or Firm* — Bacon & Thomas, PLLC

(57) ABSTRACT

A measuring transducer for metrological registering of a pressure to be measured as relative pressure referenced to a reference pressure reigning in the environment of the measuring transducer, comprising: a housing; a relative pressure sensor arranged in the housing; a pressure supply, via which the pressure to be measured is fed to the relative pressure sensor, and a reference pressure supply, via which the reference pressure is fed to the relative pressure sensor. An entrance of and to the reference pressure supply communicates with an opening in a housing outer wall, on whose exterior the reference pressure acts, characterized in that a pressure equalizing element is applied in the entrance of the reference pressure supply, and the pressure equalizing element has a securement element, a filter element and a protective cap.

9 Claims, 2 Drawing Sheets

(56) References Cited

U.S. PATENT DOCUMENTS

| | | | |
|---|---|---|---|
| 8,430,114 B2* | 4/2013 | Welch | F16H 57/027 |
| | | | 137/197 |
| 8,863,580 B2* | 10/2014 | Hausler | G01L 19/0636 |
| | | | 210/449 |
| 2003/0005772 A1 | 1/2003 | Hegner et al. | |
| 2003/0024321 A1 | 2/2003 | Burczyk et al. | |
| 2011/0056574 A1 | 3/2011 | Welch et al. | |
| 2012/0279580 A1 | 11/2012 | Hausler et al. | |
| 2016/0313200 A1* | 10/2016 | Rupp | G01L 9/0075 |

FOREIGN PATENT DOCUMENTS

| | | |
|---|---|---|
| CN | 102768095 A | 11/2012 |
| DE | 10122511 A1 | 11/2002 |
| DE | 102008004358 A1 | 7/2009 |
| DE | 202011108899 U1 | 3/2012 |
| DE | 102012109632 A1 | 4/2014 |
| DE | 102014107251 A1 | 11/2015 |
| EP | 0974825 A2 | 1/2000 |
| JP | 2003279430 A | 10/2003 |
| WO | 2004/090494 A2 | 10/2004 |

OTHER PUBLICATIONS

International Search Report, EPO, The Netherlands, dated Jun. 12, 2015.
English Translation of the International Preliminary Report on Patentability, WIPO, Geneva, CH, dated Dec. 1, 2016.

* cited by examiner

PRESSURE EQUALIZING ELEMENT

TECHNICAL FIELD

The invention relates to a measuring transducer for metrological registering of a pressure to be measured as relative pressure referenced to a reference pressure in the environment of the measuring transducer.

BACKGROUND DISCUSSION

Field devices, such as, for example, a measuring transducer, are applied widely in process and automation technology. The field devices serve for registering and/or influencing process variables. Serving for registering process variables are measuring devices, such as, for example, a measuring transducer for pressure, which registers the corresponding process variable, pressure. For influencing process variables, actuators are used, such as valves or pumps, via which e.g. the pressure in a line or in a container is changed.

In situations, in which an error occurs in the registering of a process variable, it can happen that due to this error the influencing of the process variable happens defectively. For example, if a measuring transducer registers a pressure defectively, so that a pressure measurement value is ascertained, which corresponds to a pressure, which is lower than an actual pressure in a container, it can happen that a control unit connected with the pressure measuring transducer and with a pump so controls a pump via a control system that the pressure in the container is still further increased. Such an error can possibly cause considerable damage.

In the case of pressure measuring devices, respectively transducers for measuring pressure, there are in some applications requirements relative to cleanliness. The field devices, which are applied, for example, in a yogurt factory, must be so cleaned that hygienic requirements are fulfilled. Among other things, this means that the pressure measuring devices are cleaned in a specified manner. In the course of this, the opening of the reference pressure supply in the wall of the housing of a relative pressure measuring transducer must be protected against the penetration of water, for example, during a cleaning procedure. If water or other material penetrates into the reference pressure supply, it can lead to errors in the registering of the pressure.

It is known, for example from German Patent, DE 20 2011 108 899 U1, to incorporate a (polytetrafluorothylene) PTFE membrane into the reference pressure supply. This enables the penetration of air but blocks liquids.

Pressure measuring devices are applied under varied conditions. Among other things, this means that the spatial orientation, in which the measuring device will be mounted, is not known at the time of fabrication of the measuring device. Therefore, it can occur that an installed PTFE membrane has a recess or forms a pocket with the housing wall. When the measuring device or the measuring transducer is then so mounted that water can collect in this recess, this can likewise lead to an error in the registering of the pressure.

SUMMARY OF THE INVENTION

It is, consequently, an object of the invention to provide a measuring transducer for metrological registering of a pressure to be measured, which measuring transducer is so constructed that liquids as well as other materials cannot penetrate into the reference pressure supply and that liquid rolls off the opening of the reference pressure supply independently of the spatial orientation of the measuring transducer.

The object is achieved according to the invention by a measuring transducer of automation technology comprising a housing, a relative pressure sensor arranged in the housing, a pressure supply, via which the pressure to be measured is fed to the relative pressure sensor, and a reference pressure supply, via which the reference pressure is fed to the relative pressure sensor, wherein an entrance of and to the reference pressure supply communicates with an opening in a housing outer wall, on whose exterior the reference pressure acts, wherein a pressure equalizing element is applied in the entrance of the reference pressure supply, wherein the pressure equalizing element has a securement element, a filter element and a protective cap. The securement element has an axial bore and serves to secure the pressure equalizing element in the opening of the wall, wherein the filter element is arranged on the securement element in such a manner that an inner surface of the filter element covers at least the axial bore, wherein the protective cap protecting the filter element against environmental influences has at least one perimetral window, which is so arranged that the region of the at least one window toward the filter element is located essentially at the plane of the outer surface of the filter element.

The filter element is so placed on the securement element that water and/or other liquids can always drain away. In other words, the pressure equalizing element has no depressions.

Advantageously, the pressure equalizing element can then be mounted in all orientations. For the case, in which the pressure equalizing element is arranged at a fixed position on a housing, the housing can be mounted without having to take the spatial orientation of the pressure equalizing element into consideration.

The at least one perimetral window of the protective cap can be, for example, an oval-shaped or circular opening in a wall of the protective cap.

In an advantageous embodiment, the filter element is a liquid blocking but gas transmissives filter element. An example of such is a PTFE membrane known from the state of the art, such as that offered, for example, by the firm, GORE, in the year 2014. Thus, a filter element serves to protect the inner space of the housing, respectively the reference pressure supply, against penetration of liquids, wherein the function of the reference supply, namely to transmit the reference pressure from outside the housing inwards, is, thus, not disturbed.

In a further development, the filter element is a hydrophobic or hydrophobized filter element. This can be, for example, a filter element, which is manufactured of a material with hydrophobic properties. The filter element can, however, also be, for example, a material, which has been chemically or biologically or in other manner so treated so that at least the outer surface of the filter element has hydrophobic properties. Furthermore, the filter element can be composed of a plurality of materials, wherein at least one material, which forms a part of the outer surface of the filter element, is hydrophobic or made hydrophobic. Another option is a hydrophobic coating. Consequently, water and water-based liquids are especially effectively driven from the outer surface of the filter element. In other words, moisture on the outer surface can roll off in the form of little beads.

A preferred embodiment provides that the securement element and the protective cap are manufactured of synthetic material, e.g. plastic, via an injection molding method. The application of an injection molding method enables an advantageous manufacturing process.

A preferred embodiment provides that the securement element and the protective cap are manufactured of metal. A securement element manufactured of metal, for example, a stainless steel, has the special advantage that it is stable and robust against damaging environmental influences. In the case of a cleaning procedure, for example, in which a high pressure jet cleaner is used, a metal structure is necessary, in order to resist the high pressure. Furthermore, at least one metal upper layer for the protective cap and for the securement element is advantageous, in order to meet the hygienic requirements in certain applications, in which a relative pressure measuring transducer is required.

In the case of an advantageous further development, it is provided that the securement element of the pressure equalizing element has a battlement-shaped structure, which is arranged around the filter element on the side of the filter element facing away from the relative pressure sensor. This creates protection around the filter element.

In the case of an advantageous further development, it is provided that the protective cap is so affixed on the securement element that the at least one window of the protective cap lies opposite a merlon of the battlement-shaped structure. Furthermore, a crenel of the battlement-shaped structure lies opposite a portion of the wall of the protective cap where no window is located. In such case, a meander-shaped labyrinth structure is formed, so that no spatially linear access to the entrance of the reference pressure supply at the opening facing end of the reference pressure supply, respectively to the filter element, which covers the entrance, is possible from outside of the housing.

An embodiment provides that the protective cap is affixed to the securement element with a detent mechanism. Thus, the protective cap can be mounted on the securement element with a predetermined position and orientation.

An embodiment provides that the detent mechanism is so embodied that the protective cap and the securement element are connected releasably with one another. This embodiment enables rapid deconstruction/construction. Thus, the manufacturing process is simplified, and replacement parts, such as, for example, a new filter element, can be replaced in simple manner.

An embodiment provides that the protective cap is affixed to the securement element by means of a press fit. This embodiment is especially advantageous for a pressure equalizing element manufactured of metal.

In the case of an advantageous further development, the securement element is screwed into the wall of the housing. In the case of another further development, the securement element is inserted into and/or welded and/or adhered to the wall of the housing. Preferably, a sealing ring is provided, which hermetically seals the connection between the securement element and the housing. In this way, air exchange is conducted over a controlled path, which extends via the filter element.

BRIEF DESCRIPTION OF THE DRAWINGS

The invention will now be explained in greater detail based on the appended drawing. Equal elements are provided in the figures of the drawing with equal reference characters. The figures of the drawing show as follows.

DETAILED DISCUSSION IN CONJUNCTION WITH THE DRAWINGS

Figure 1:
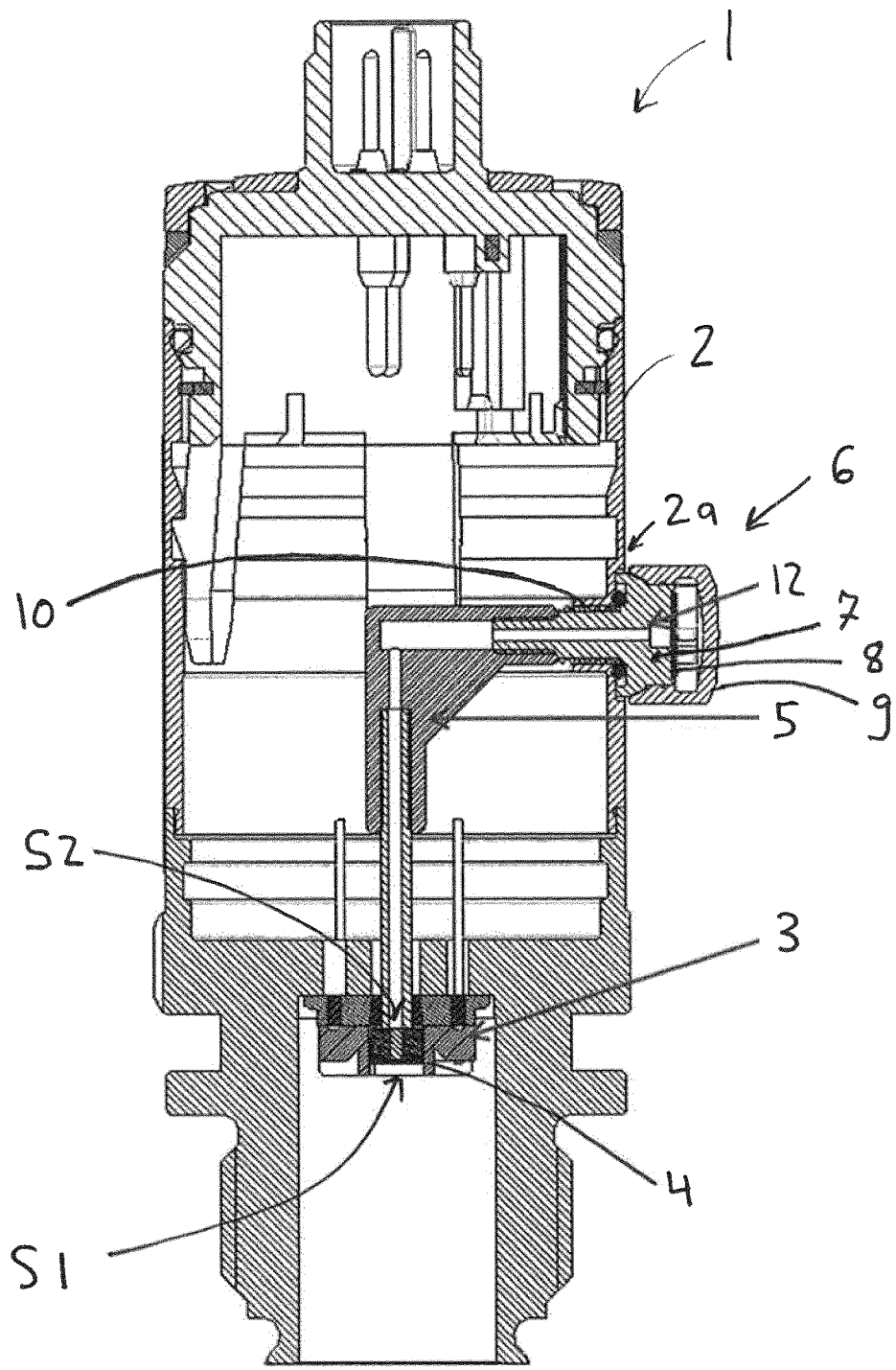
FIG. 1 is a schematic cross section of a pressure measuring transducer.

FIG. 1 shows a schematic cross section of a measuring transducer 1 for pressure. Especially, measuring transducer 1 is shown for metrological registering of a pressure p to be measured as relative pressure $p_R$ referenced to a reference pressure $p_{ref}$ reigning in the environment of the measuring transducer 1.

In the case of most applications, the reference pressure $p_{ref}$ is the atmospheric pressure at the location of use. If the measuring transducer 1 is, however, applied e.g. in a space under positive- or negative pressure, then the reference pressure $p_{ref}$ is, for example, the internal pressure of the space.

The measuring transducer 1 includes a housing 2, in which a relative pressure sensor 3 is arranged. The relative pressure sensor 3 includes a pressure sensitive element 4, especially a measuring membrane, whose first side S1 is supplied in measurement operation with the pressure p to be measured and whose second side S2 is supplied in measurement operation with the reference pressure $p_{ref}$. A pressure difference applied across the pressure sensitive element 4, between the pressure p to be measured and the reference pressure $p_{ref}$, effects a deflection of the pressure sensitive element 4 dependent on the metrologically to be registered, relative pressure $p_R$. Such is registered by means of an electromechanical transducer and converted into an electrical output signal dependent on the relative pressure $p_R$ to be measured. This signal is then available for further processing and/or evaluation.

Suited for this, are, for example, semiconductor sensors, such as e.g. silicon-chips having a pressure sensitive membrane 4 applied on a platform P and piezo-resistive resistance elements doped in the membrane. These piezo-resistive resistance elements are, for example, connected together to form a measuring bridge circuit.

Alternatively however, also other sensor types, e.g. capacitive, ceramic, relative pressure measuring cells, can be applied.

A pressure supply (not shown) is provided, via which the pressure p to be measured is fed to the pressure sensitive element 4 of the relative pressure sensor 3. The pressure supply is, for example, a pressure transfer means connected in front and filled with a pressure transferring liquid. The pressure transfer means includes, for example, outwardly closed by an isolating diaphragm, a pressure receiving chamber, which is connected via a pressure transfer line with a measuring chamber, in which the first side S1 of the pressure sensitive element 4 is exposed to the pressure reigning in the measuring chamber. The pressure p to be measured is fed to the outside of the isolating diaphragm directly or via a process connection, and transmitted via the isolating diaphragm and the pressure transferring liquid into the measuring chamber, where it then acts on the pressure-sensitive element 4 of the relative pressure sensor 3.

Further provided is a reference pressure supply 5, via which the second side S2 of the pressure sensitive element 4 of the relative pressure sensor 3 is fed the reference pressure $p_{ref}$. For this, the reference pressure supply 5 comprises a pressure carrying line, which leads from the relative pressure sensor to an outer wall of the housing 2, where the reference pressure $p_{ref}$ reigns on the exterior of the outer wall. The reference pressure supply 5 communicates with a pressure equalizing element 6 of the invention, which is secured in a bore through the wall 2a of the housing 2. The reference pressure supply 5 is, such as shown in FIG. 1, coupled directly to the pressure equalizing element 6. The reference pressure supply 5 can be, for example, a flexible hose. Many different embodiments of a reference pressure supply 5 can be used and the invention is not limited to any certain one of such embodiments.

Figure 2:
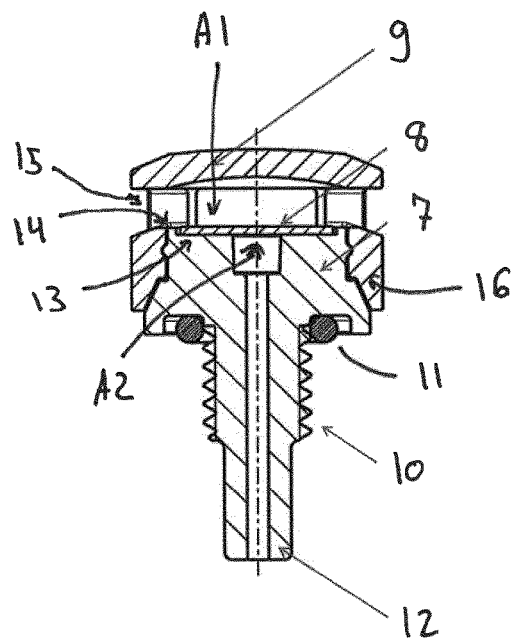
FIG. 2 is a schematic cross section of a first variant of a pressure equalizing element.

FIG. 2 shows a schematic cross section of a first variant of a pressure equalizing element 6. The pressure equalizing element 6 includes a securement element 7, a filter element 8 and a protective cap 9. The securement element 7 is secured in the wall 2a of the housing 2 by means of the thread 10. For sealing the connection between the securement element 7 and the wall 2a of the housing 2 a sealing ring 11, especially an O-ring 11, is provided. An axial bore 12 is also shown in FIG. 2. The filter element 8 sits in a shallow cavity 13 of the securement element 7 surrounded by an edge 14 of the securement element 7, so that the outer surface A1, respectively the upper area A1, of the filter element 8 shown in FIG. 2 sits at a height of or even slightly higher than the edge 14 of the securement element 7. Thus, it is assured that liquids can always roll off.

The protective cap 9 shown in FIG. 2 includes circumferential windows 15. When the protective cap 9 is mounted on the securement element 7, the lower regions of the windows 15 shown in FIG. 2 lie at the height of or even lower than the outer surface A1 of the filter element 8.

A detent mechanism 16 is present, which serves so to affix the protective cap 9 to the securement element 7 that the protective cap 9 is affixed at a certain orientation with reference to the securement element 7.

Through cooperation of protective cap 9, filter element 8, and securement element 7, in combination with a variant of the pressure equalizing element 6 manufactured of synthetic material, e.g. plastic, the measuring transducer 1 as a whole satisfies the requirements of protection types IP66 and/or IP67 of the German industry standard DIN 40 050, part 9, of the year 1993. Thus, for example, even in the case of intermittent immersion of the measuring transducer 1 into water, no water amount sufficient to cause damage enters the housing 2.

Figure 3:
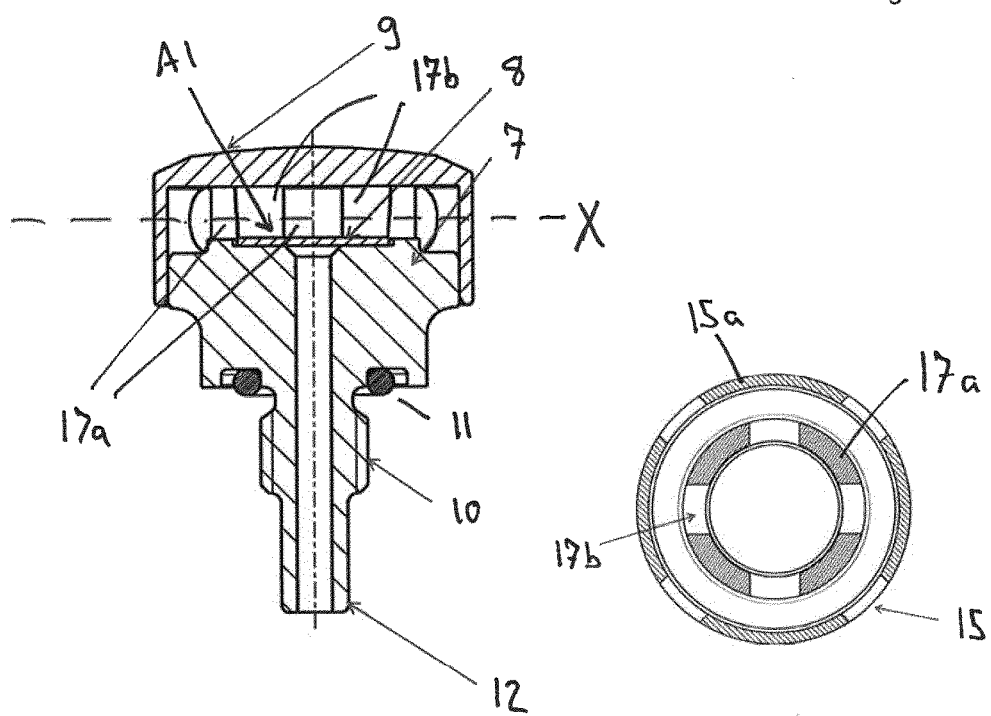
FIG. 3 is a schematic cross section of a second variant of a pressure equalizing element.

FIG. 3 shows a schematic cross section of the second variant of a pressure equalizing element 6. As in the first variant, FIG. 3 also includes a securement element 7, a filter element 8 and a protective cap 9.

The securement element 7 of the pressure equalizing element 6 is mounted in a wall 2a of the housing 2 by means of a thread 10. The securement element 7 includes an air path 12 in the form an axial bore 12, which serves to guide a reference pressure $p_{ref}$ located in the environment of the measuring transducer 1 through the wall 2a of the housing 2. A filter element 8 is shown in FIG. 3. The filter element 8 is, for example, a liquid blocking but gas transmissive membrane, which sits in the air path 12. An O-ring 11 is provided for sealing the connection of the securement element 7 with the housing wall 2a. A protective cap 9 is provided, which is arranged on the securement element 7 by means of a press fit.

Further provided in FIG. 3 is a battlement-shaped structure 17, which is arranged on the upper side A1 of the securement element 7 illustrated in FIG. 3. This structure 17 is so positioned that the filter element 8 is partially encircled. The filter element 8 sits, same as in FIG. 2, at a height of or higher than the edge 13 of the securement element. The battlement-shaped structure 17 present in this variant includes merlons 17a and crenels, or windows, 17b, wherein the windows 17b are bounded on a lower side by the edge 13 of the securement element 7. In this way, a type of protection for the filter element 8 is produced, without that a recess is created, in which water and/or other liquids could collect.

Figure 4:
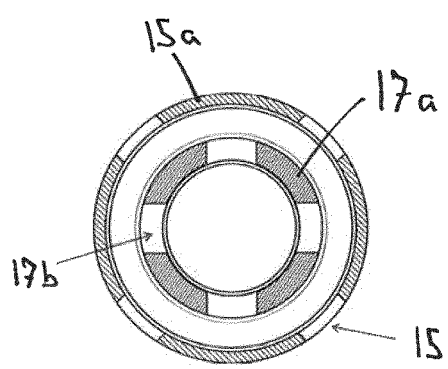
FIG. 4 is a schematic cross section of the pressure equalizing element illustrated in FIG. 3 taken along the cutting plane X shown in FIG. 3.

FIG. 4 shows a schematic cross section of the pressure equalizing element 6 illustrated in FIG. 3 taken along the cutting plane X in FIG. 3. This shows an advantageous arrangement of the protective cap 9 on the securement element 7. The windows 15 of the protective cap 9 are so positioned that they lie opposite the merlons 17a of the battlement-shaped structure 17. Thus, a labyrinth structure is formed such that a water jet directed at the protective cap 9 cannot reach through to the filter element 8, because a merlon 17a is situated at the locations, where a window 15 is present in the protective cap 9, and at the locations 17b, where the battlement-shaped structure has a window 17b, the wall 15a of the protective cap 9 is oppositely lying, for example, in the radial direction. Thus, there is no direct access for jets of water to hit the filter element 8 from outside of the pressure equalizing element 6. This is especially advantageous in the case of a cleaning procedure, in which a high pressure jet cleaner is used.

Through cooperation of protective cap 9, battlement-shaped structure 17 of the securement element 7 and filter element 8 in combination with the variant of the pressure equalizing element 6 manufactured of metal, the measuring transducer 1, as a whole, satisfies the requirements set in the protection class IP69K, respectively the German industrial standard DIN 40050-9 of the year 1993. The measuring transducer can, thus, also be applied in applications, in which high-pressure jet cleaning with water amounts e.g. of up to 15 liter per minute, under high pressure, especially up to 100 bar, in given cases, also at high temperatures, especially at temperatures of up to 80° C., act on the housing 2 of the measuring transducer 1.

The invention claimed is:

1. A measuring transducer for metrological registering of a pressure to be measured as relative pressure referenced to a reference pressure reigning in the environment of the measuring transducer, comprising:
   a housing;
   a relative pressure sensor arranged in said housing;
   a pressure supply, via which the pressure to be measured is fed to said relative pressure sensor;
   a reference pressure supply, via which the reference pressure is fed to said relative pressure sensor;
   an entrance of and to said reference pressure supply communicates with an opening in an outer wall of said housing, on whose exterior the reference pressure acts;
   a pressure equalizing element is applied in said entrance of said reference pressure supply; wherein:
   said pressure equalizing element has a securement element, a filter element and a protective cap;
   said securement element has an axial bore and serves to secure said pressure equalizing element in said opening of said wall;
   said filter element is arranged on said securement element in such a manner that an inner surface of said filter element covers at least said axial bore;
   said protective cap protecting said filter element against environmental influences has at least one perimetral window, which is so arranged that the region of said at least one window toward said filter element is located essentially at the plane of the outer surface of said filter element;

said securement element of said pressure equalizing element has a battlement-shaped structure, which is arranged around said filter element on the side of said filter element facing away from said relative pressure sensor; and said protective cap is so affixed to said securement element that said at least one window of said protective cap lies opposite a merlon of said battlement-shaped structure.

2. The measuring transducer as claimed in claim 1, wherein:

said filter element is a liquid blocking but gas transmissive filter element.

3. The measuring transducer as claimed in claim 1, wherein:

said filter element is a hydrophobic or hydrophobized filter element.

4. The measuring transducer as claimed in claim 1, wherein:

said securement element and said protective cap are manufactured of synthetic material via an injection molding method.

5. The measuring transducer as claimed in claim 1, wherein:

said securement element and said protective cap are manufactured of metal.

6. The measuring transducer as claimed in claim 5, wherein:

said protective cap is affixed to said securement element by means of a press fit.

7. The measuring transducer as claimed in claim 1, wherein:

said protective cap is affixed to said securement element with a detent mechanism.

8. The measuring transducer as claimed in claim 7, wherein:

said detent mechanism is so embodied that said protective cap and said securement element are connected releasably with one another.

9. The measuring transducer as claimed in claim 1, wherein:

said securement element is screwed into the wall of said housing.

* * * * *